(12) United States Patent
Liebhard et al.

(10) Patent No.: US 6,896,317 B2
(45) Date of Patent: May 24, 2005

(54) ENERGY-ABSORBING DEFORMATION ELEMENT FOR VEHICLES

(75) Inventors: Oliver Liebhard, Schleitheim (CH); Markus Gehrig, Schaffhausen (CH)

(73) Assignee: Alcan Technology & Management Ltd., Neuhausen Rheinfall (CH)

( * ) Notice: Subject to any disclaimer, the term of this patent is extended or adjusted under 35 U.S.C. 154(b) by 0 days.

(21) Appl. No.: 10/341,927

(22) Filed: Jan. 14, 2003

(65) Prior Publication Data

US 2004/0201254 A1 Oct. 14, 2004

(30) Foreign Application Priority Data

Jan. 16, 2002 (EP) .......................................... 02405025

(51) Int. Cl.⁷ ............................................ B60R 19/18
(52) U.S. Cl. ........................ 296/187.03; 296/187.09; 296/187.11; 296/203.02; 296/203.04; 293/102; 293/132
(58) Field of Search ................. 296/187.03, 187.09, 296/187.11, 203.02, 203.04, 205, 193.04; 293/102, 122, 132, 133, 154, 155; 188/371

(56) References Cited

U.S. PATENT DOCUMENTS

| | | | |
|---|---|---|---|
| 4,154,469 A | | 5/1979 | Goupy et al. |
| 5,150,935 A | | 9/1992 | Glance et al. |
| 5,338,080 A | * | 8/1994 | Janotik et al. ................. 296/29 |
| 5,393,111 A | * | 2/1995 | Eipper et al. ................ 293/109 |
| 5,431,445 A | * | 7/1995 | Wheatley ..................... 280/784 |
| 6,003,930 A | | 12/1999 | Frank et al. |
| 6,068,330 A | * | 5/2000 | Kasuga et al. ......... 296/187.09 |
| 6,209,934 B1 | * | 4/2001 | Sakuma et al. ............. 293/120 |
| 6,227,582 B1 | * | 5/2001 | Ichien ........................ 293/132 |
| 6,258,465 B1 | | 7/2001 | Oka et al. |
| 6,416,094 B1 | * | 7/2002 | Cherry ....................... 293/120 |
| 6,655,728 B2 | * | 12/2003 | Sano et al. ............. 296/203.02 |

FOREIGN PATENT DOCUMENTS

| | | |
|---|---|---|
| CH | 691731 | 9/2001 |
| DE | 2741969 | 3/1978 |
| DE | 19830560 | 5/1999 |
| FR | 2761434 | 10/1998 |

* cited by examiner

Primary Examiner—D. Glenn Dayoan
Assistant Examiner—Greg Blankenship
(74) Attorney, Agent, or Firm—Ostrolenk, Faber, Gerb & Soffen, LLP

(57) ABSTRACT

A deformation element having a single or multi-chamber hollow section with a longitudinal axis to accommodate energy of impact acting in the direction of the longitudinal axis of the section. The deformation element contains outer section walls that form inner and outer section wall faces. The outer section walls are divided into section wall end lengths and lengths and section wall intermediate lengths, whereby the abutting section wall end length of a pair of outer section walls form corner regions with corners. The wall thicknesses of the section wall end lengths are greater than the wall thickness of the section wall lengths neighboring the section wall end lengths, with the result that a thickening of the section wall is provided in the corner region.

25 Claims, 3 Drawing Sheets

Figure 3:
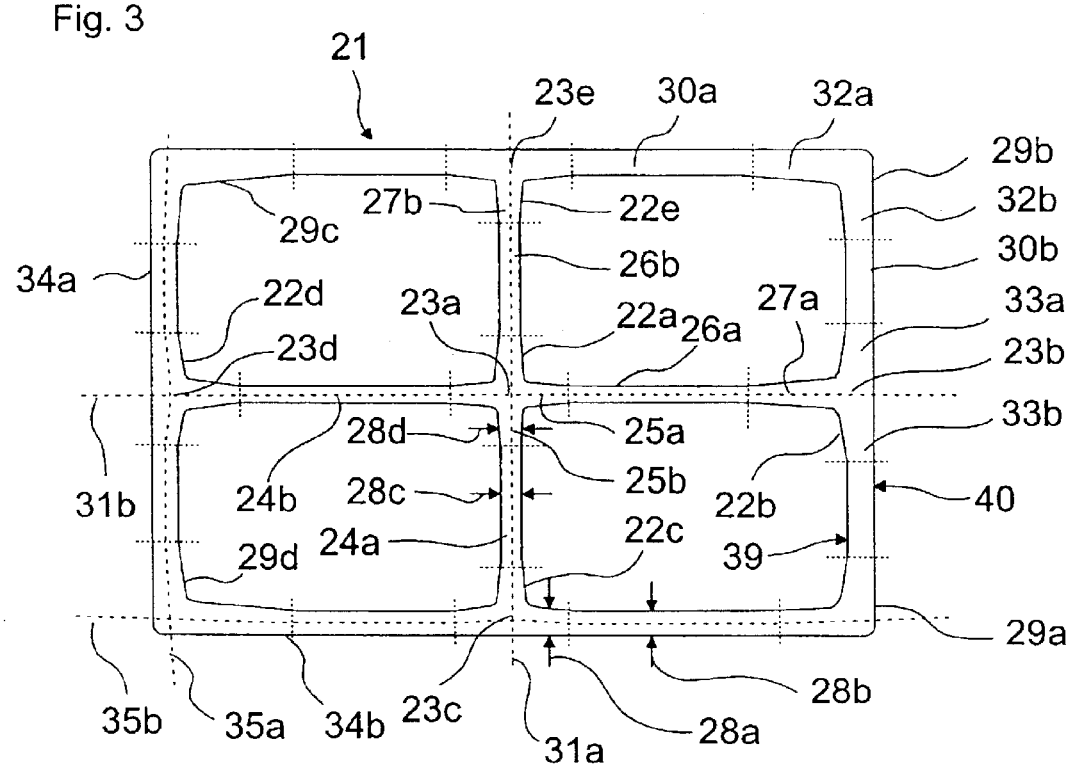

Fig. 1 Prior Art
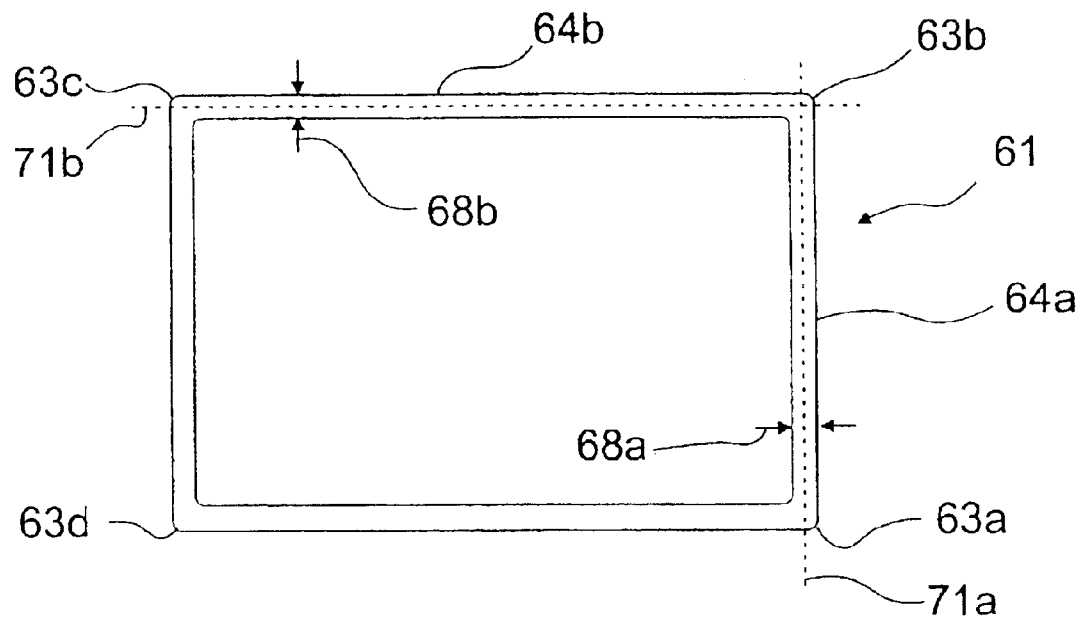
Fig. 2
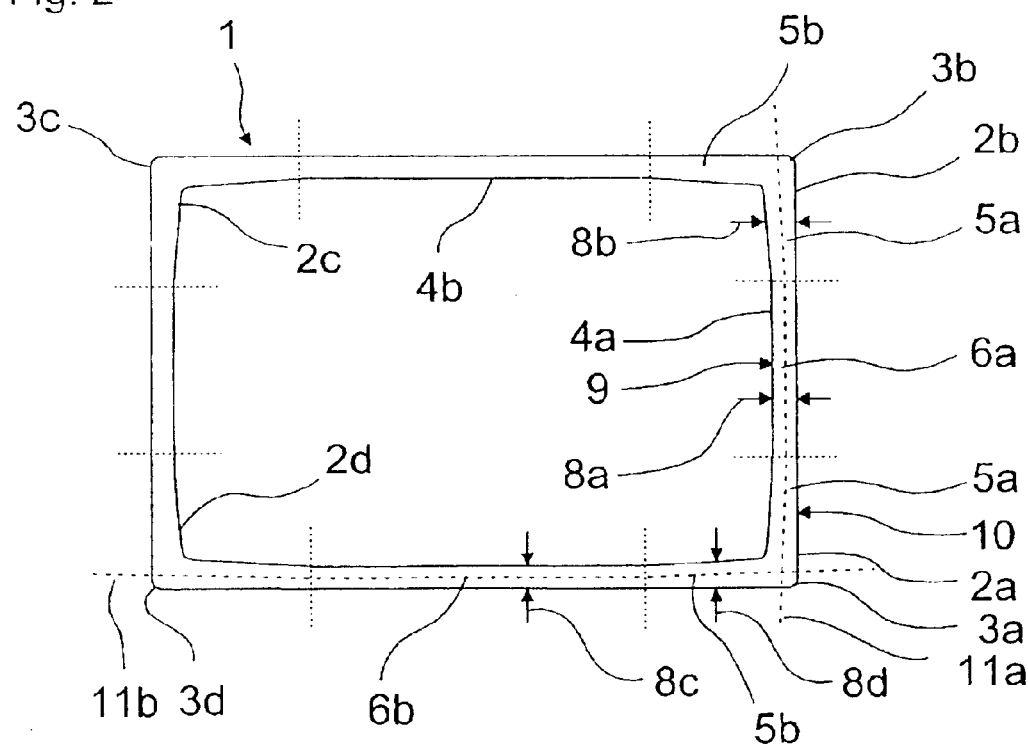

ENERGY-ABSORBING DEFORMATION ELEMENT FOR VEHICLES

BACKGROUND OF THE INVENTION

The present invention relates to a deformation element comprising a single or multi-chamber hollow section with a longitudinal section axis to accommodate energy of impact acting in the direction of the longitudinal axis of the section, containing outer section walls that form inner and outer section wall faces with section end lengths and corner regions forming corners, whereby the corner regions are formed by two abutting section wall end lengths. Further, the invention relates to the use of such deformation elements.

Tube-shaped or hollow section-like deformation elements to accommodate them energy of impact acting on the end of the deformation elements are known in general. The absorption of the energy of impact takes place by uniform folding of the section walls as the deformation element is crushed.

Document CH 691 731 describes e.g. a vehicle with a bumper which is attached to longitudinal beams of the vehicle via deformation elements. The deformation elements are made up of multi-chamber hollow sections with at least one inner strut running in the longitudinal direction. A fraction of the energy of impact is absorbed by bellow-like folding when the deformation element is crushed in the longitudinal direction.

Deformation elements or energy absorbing structures should exhibit the highest possible specific absorption of energy, i.e. as much energy as possible per unit mass should be absorbed. Only this way is it possible to meet at the same time the requirements for the lightest and safest vehicles i.e. such fitted with energy absorbing structures.

SUMMARY OF THE INVENTION

The object of the present invention is therefore to propose a deformation element of the kind described at the beginning, which exhibits higher specific energy absorption than conventional deformation elements of the same kind. The deformation element should absorb the prevailing energy of impact by forming a bellows-like folding structure.

That objective is achieved by way of the invention in that the wall thickness of a section wall end length in at least one corner region, is thicker at least over a longitudinal section length, measured in the longitudinal direction of the section, than the wall thickness of the section wall length neighboring the section wall end length, with the result that there is a thickening of the section wall in the corner region, whereby, in comparison to a deformation element with uniform wall thickness but of the same shape and overall mass, higher specific energy absorption is achieved.

The outer lying section wall face is the outer facing section wall face of the outer section wall and the inner lying section wall face is the inner facing section wall face of the outer section wall.

The wall thickness is preferably measured orthogonal to a related section wall middle area. The section wall middle area is the area running in the middle between the two section wall faces.

In a preferred version of the invention the wall thickness of the section wall end length in at least one corner region, preferably all corner regions, is greater than the wall thickness of the section wall length neighboring the section wall end lengths. Further, the wall thickness of the section wall end length or lengths is preferably greater over the whole length of the deformation element than the wall thickness of the section wall length neighboring the corresponding section wall end length.

The wall thickness of the section wall end length may increase stepwise or continuously towards the corner. Further, the wall thickness between the section wall end length and the neighboring section wall length may increase suddenly. The maximum wall thickness of the section wall end length is e.g. at least 5%, preferably at least 15% and in particular at least 20% greater than the minimum wall thickness of the section wall length neighboring the section wall end length. Further, the maximum wall thickness of the section wall end length is preferably at most 200%, in particular at most 150% and advantageously at most 100% greater than the minimum wall thickness of the section wall length neighboring the section wall end length.

The average wall thickness of the section wall end length is e.g. at least 5% preferably at least 15% and in particular at least 20% and at most 200%, preferably at most 100%, and in particular at most 60% greater than the average wall thickness of the section wall length neighboring the section wall end length.

The wall thickness of the section wall length neighboring the section wall end length may be variable or, preferably, uniform.

The outer and/or inner lying section wall faces may be flat or curved. In a preferred version the outer lying section wall faces are flat whereby, the inner lying section wall face in the section wall end lengths exhibits a slope which increases the wall thickness measured relative to the outer lying section wall face.

The deformation element may be polygonal in cross-section, for example tri-angular, four-sided or six-sided. The deformation element is preferably box-shaped. The deformation element may be a single or multi-chamber hollow section with one, two, three, four or more chambers.

For example in the case of sections that are rectangular or box-shaped in cross-section, the section wall end lengths in the corner regions meet at an angle of 85–95° (degrees of angle) and, in the case of a hexagonal cross-section, at an angle of 115–125°.

Between two section wall end lengths of an outer section wall are preferably section wall intermediate lengths, whereby the section wall intermediate lengths correspond to the section wall lengths neighboring the section wall end lengths.

The length of the section wall end length of a corner region corresponds e.g. to at least 5%, preferably at least 10%, in particular at least 15%, advantageously at least 20%, and at most 45%, preferably at most 35%, in particular at most 25% of the length of the related outer section wall.

In a further version of the invention the deformation element is a multi-chamber hollow section with one or more inner section walls with section wall end lengths forming nodal regions. The inner section inner walls may run orthogonal and/or in the middle and parallel to the outer section walls and divide the hollow section into several, in particular two or four chambers. The inner section walls may e.g. also run diagonal and join up opposite lying corners.

The nodal regions are formed by at least two section wall end lengths of the inner section walls that meet at an angle, or by at least two section wall end lengths of an inner and outer section wall that meet at an angle.

The corner regions of the multi-chamber hollow section can be shaped as above described.

The wall thickness of at least one, preferably all section wall end lengths of at least one, preferably all nodal regions is greater than the wall thickness of the section wall length neighboring the section wall end length.

The wall thickness of the section wall end length may increase stepwise towards the node and, preferably, in a continuous manner. The maximum wall thickness of the section wall end length in a nodal region is at least 5%, preferably at least 15%, in particular at least 20% and at most 200%, preferably at most 150%, in particular at most 100% greater than the minimum wall thickness of the section wall length neighboring the section wall end length.

The average wall thickness of the section wall end length in a nodal region is at least 5%, preferably at least 15%, in particular at least 20%, and at most 200%, preferably at most 100%, in particular at most 60% greater than the average wall thickness of the section wall length neighboring the section wall end length.

The wall thickness of the section wall length neighboring the section wall end length in a nodal region is preferably uniform.

Situated between two section wall end lengths of an inner section wall is in each case preferably a section wall intermediate length, whereby the section wall intermediate length corresponds to a section wall length neighboring the section wall end length.

In a modified form of the invention it is possible also to have multi-chamber hollow sections in which only the corner regions and/or only the nodal regions feature a thickening of the walls in the section wall end lengths according to the invention.

In a preferred version of the invention the average or maximum wall thickness of the section wall end lengths in the nodal regions inside the section are smaller than the average or maximum wall thickness of the section wall end lengths in the corner regions. The average or maximum wall thickness of the section wall end lengths of the nodal regions lying on the outer section walls are preferably smaller than the average or maximum wall thickness of the section wall end lengths in the corner regions and preferably greater than the average or maximum wall thickness of the section wall end lengths in the nodal regions lying inside the section.

Expressed differently, in a preferred version the nodal regions lying inside the section exhibit smaller thickening of the wall than the nodal regions lying on the section walls and the latter exhibit smaller thickening of the walls than the corner regions of the section. This way it is possible to prevent the inner regions of the section being excessively reinforced or stiffened and as a result the tendency for folding is increased. Further, by means of the above measures, the exploitation of the deformation element is optimized i.e. the distance of deformation is by comparison longer.

The wall thickness of the outer and/or inner section walls, in particular in the section wall end lengths, may be constant or variable at the corresponding cross-sections over the length of the section. In a suitable version of the invention the wall thickness in the end region of the section i.e. in the front section end length where impact occurs, is uniform in cross-section over the whole outer and/or inner section wall from corner to corner and in the nodal regions i.e. according to the state of the art. In the longitudinal section length following section end length there are in the corner regions and/or nodal regions, section wall end lengths designed according to the invention, whereby the wall thicknesses in the section wall end lengths may exhibit a stepwise or continuous increase in the longitudinal direction of the section of the corresponding cross-sectional places.

As an increase in the wall thickness in the corner or nodal regions leads to higher peak loads, the design of deformation element according to the invention just described exhibits a reduced initial peak load. However, it is also possible to provide other means such as e.g. dents in the outer section walls in order to reduce the initial peak load.

The length ratio of section wall end length to outer section wall in multi-chamber hollow sections preferably refers to outer section wall lengths measured from corner region to nodal region.

The deformation element according to the invention may be of plastic e.g. fibre-reinforced plastic, or of metal, preferably of a light metal. The deformation element is in particular made preferably of aluminum or an aluminum alloy. The deformation element according to the invention made of metal may be manufactured out of sheet elements. In a preferred form, however, the deformation element is an extruded section.

Deformation elements according to the invention find application as energy absorbing structures in vehicles, in particular in road and railway vehicles, such as private cars, trucks, busses, trams or city and inter-city trains. The deformation elements according to the invention find application in particular in the front region of the above mentioned vehicles. Further, the deformation elements may also find application in the rear areas or if desired also in side areas of the above mentioned vehicles.

The above mentioned deformation elements may e.g. be integral components of the framework in particular of vehicle longitudinal beams. The mentioned deformation elements may also be attached to the framework of the vehicle. They may e.g. be connecting elements between the bumper and he vehicle frame or longitudinal beams. The deformation elements may e.g. be arranged in the front and/or rear regions of vehicles, whereby these are preferably arranged such that the section longitudinal axis is parallel to the longitudinal axis of the vehicle.

The deformation element according to the invention is based on the fact that in its corner and nodal regions higher energy absorption takes place by the folding process than in the section wall lengths between the corner and nodal regions. This knowledge was implemented in such a manner that - in comparison with state of the art deformation elements which are comparable in mass, dimension and shape - more mass is arranged in the corner regions and/or less mass in the section wall regions between the corner regions.

In this way it is possible, by redistributing the mass from the section walls to the corner and nodal regions, with the same overall mass higher specific absorption of energy can be achieved, so that with the deformation element according to the invention e.g. a 10–30% higher specific absorption of energy can be achieved than with a deformation element according to the state of the art which is comparable in dimension and shape.

Figure 4:
Figure 5:
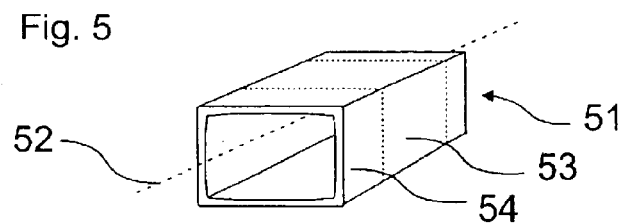
Figure 6A:
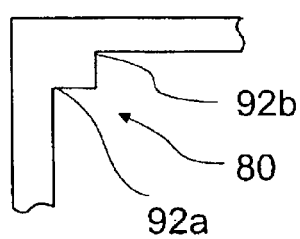
Figure 6B:
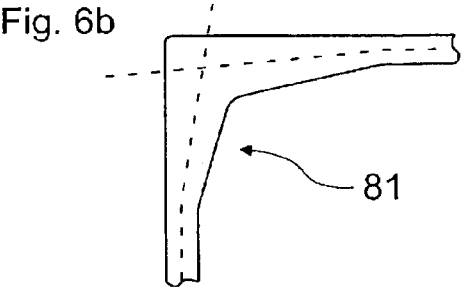
Figure 6C:
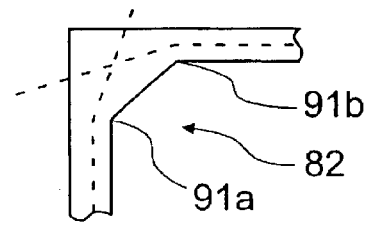
Figure 6D:
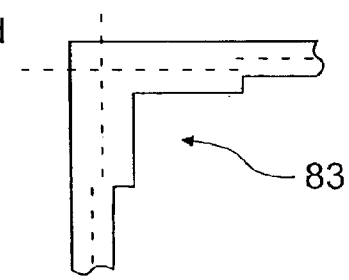
Figure 6E:
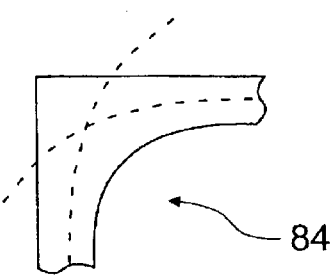
Figure 6G:
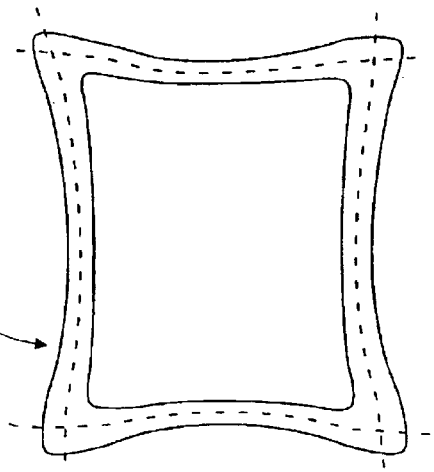
Figure 6F:
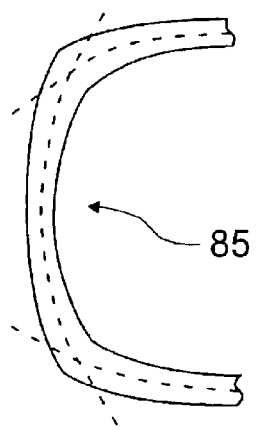

BRIEF DESCRIPTION OF THE DRAWINGS in the following the invention is described in greater detail by the way of example and with the reference to the accompanying drawings. These are:

FIG. 1: cross section of a deformation element according to the state of the art;

FIG. 2: cross-section of a deformation element according to the invention;

FIG. 3: cross-section of a further deformation element according to the invention;

FIG. 4: side view of a folded deformation element as in FIG. 3;

FIG. 5: perspective view of a deformation element according to the invention as in FIG. 2;

FIGS. 6a–f: cross-section through a corner region of further deformation elements according to the invention;

FIG. 6g: cross-section through a further deformation element according to the invention.

DETAILED DESCRIPTION OF THE PREFERRED

The deformation element 61 according to the state of the art shown in FIG. 1 is a single chamber hollow section with outer section walls 64a,b and corners 63a–d. Each of the outer section walls 64a,b exhibits, from corner to corner, a uniform wall thickness 68a,b measured orthogonal to the corresponding section wall middle 71a,b.

For reasons of clarity, not all redundant features in FIG. 1 are indicated by letters or numbers.

The deformation element 1 according to the invention shown in FIG. 2 is a single chamber hollow section. The deformation element 1 contains outer section walls 4a,b with outer lying 10 and inner 9 lying section wall faces. The outer section walls 4a,b are divided into section wall end lengths 5a,b and section wall intermediate lengths 6a, b./ Further, the deformation element features corner regions 2a–d which are formed in each case by two section wall end lengths 5a,b that meet orthogonal and form corners 3a–d. In each case there is a section wall intermediate length 6a,b situated between two section wall end lengths of a section wall 4a,b. The section wall end lengths 5a,b have a wall thickness 8b,d which is greater than the wall thickness 8a,c of the neighboring section wall intermediate lengths 6a,b, whereby the later wall thicknesses 8a,c are uniform over the whole length. The wall thickness 8b,d of the section wall end lengths 5a,b increases continuously from the bordering section wall intermediate lengths 6a,b to the corners 3a,d. The wall thicknesses 8a,d are thereby measured orthogonal to the corresponding section wall middle 11a,b.

For reasons of clarity, not all redundant features in FIG. 2 are indicated by letters or numbers.

The deformation element 21 shown in FIG. 3 is a multi-chamber hollow section. The deformation element 21 contains outer section walls 34a,b with outer lying 40 and inner lying 39 section wall faces. The outer section walls 34a,b are divided into section wall end lengths 32a,b 33a,b and section wall intermediate lengths forming corner regions 29a–d and nodal regions 23b–e respectively. The corner regions 29a–d are formed in each case by two section wall end lengths 32a,b which meet at right angles and form corners. Further, the corner regions 29a–d are shaped analogous to the corner regions 2a–d in FIG. 2. Reference should be made to the relevant description.

The multi-chamber hollow section 21 contains two inner section walls 24a,b which cross each other forming a central nodal region 22a which, in cross-section, divides the space inside the section into four section chambers. The inner section walls 24a,b are divided into section wall end lengths 25a,b and section wall intermediate lengths 26a,b. The section wall end lengths 25a,b of the inner section walls 24a,b form a central nodal region 22a with one node 23a.

Where the section wall end lengths 27a,b of the inner section walls 24a,b meet the outer section walls 34a,b they form outer nodal regions 22b–e with nodes 23b–e. Situated between the two section wall end lengths 27a,b and 25a,b i.e. between the central 22a and the outer nodal regions 22b–e are section wall intermediate lengths 26a,b. Situated between the section wall end lengths 32a of the corner regions and the section wall end lengths 33a,b of the neighboring outer nodal regions 22b–e are section wall intermediate lengths 30a,b.

The thickness of section wall end lengths 25a,b; 27a,b; 33a,b of the inner 22a and the outer nodal regions 22b–e and the corner regions 29a–d increase continuously towards the nodes 23a–e and the corners 29a–d, whereby the said wall thickness 28a,d is greater than the wall thickness 28b,c of the neighboring section wall intermediate lengths 30a,b, 26a,b.

The wall thickness 28b,c of the section wall intermediate length 30a,b, 26a,b is uniform. The wall thicknesses 28a–d are thereby measured orthogonal to the elated section wall middle 35a,b, 31a,b.

For reasons of clarity, not all redundant features in FIG. 3 are denoted by letters or numbers.

FIG. 4 shows a multi-chamber section 41 according to FIG. 3 in the bellows-like, completely crushed state. The multi-chamber section 41 is characterized by the uniform shape of the folds 42. The ratio of the distance of deformation to the overall length of the deformation element determines the so-called degree of exploitation.

FIG. 5 shows a perspective view of the deformation element 51 in FIG. 2 with its longitudinal section axis 52. Also shown is a longitudinal section length 53 and the section end length 54 at the end.

The examples in FIGS. 6a–f show further versions in shape of the corner regions 80,81,82,83,84,85 and the related section wall end lengths of deformation elements with the related section middle planes according to the invention. In the examples according to FIGS. 6a and 6c the corner region exhibits a broadening of the section wall end length in its inner lying wall, this in such a manner that instead of a single corner grooving, there are two groovings 91a,b; 92a,b a distance from each other.

FIG. 6g shows a deformation element 86 with side walls bulging inwards. The said deformation element 86 is shaped into a dimensionally accurate, box-shaped end section by subsequent high pressure forming by applying pressure from the inside.

What is claimed is:

1. A deformation element comprising a hollow section with a longitudinal section axis to accommodate impact energy acting in a direction of the longitudinal axis of the section by compressing the deformation element in a longitudinal direction, the hollow section having outer section walls that form inner and outer section wall faces, the section walls having section end lengths and corner regions forming corners, the corner regions being formed by two abutting section wall end lengths, the section wall end length in at least one corner region having a wall thickness that is thicker than a wall thickness of a section wall length neighbouring the section wall end length so that there is a thickening of the section wall in the corner region, the corner region with the thicker wall thickness extending at least over a longitudinal section length measured in the longitudinal direction of the section, whereby, in comparison to a deformation element with uniform wall thickness but of an equal shape and overall mass, higher specific energy absorption is achieved, the section wall end length of a corner region having a length that corresponds to at least 5% and at most 45% of a length of a related section wall.

2. A deformation element according to claim 1, wherein the wall thickness of the section wall end lengths in all corner regions is greater than the wall thickness of the section wall length neighboring the section wall end length.

3. A deformation element according to claim 1, wherein the wall thickness of the section wall end lengths at least in one of the corner regions, over an entire length of the deformation element measured in the longitudinal direction of the section, is greater than the wall thickness of the section wall length neighboring the section wall end length.

4. A deformation element according to claim 1, wherein the corner region at least over a longitudinal section length measured in the longitudinal direction exhibits a broadening of the section wall end lengths while forming a pair of groovings.

5. A deformation element according to claim 1, wherein the wall thickness of the section wall end lengths increases continuously towards the corner.

6. A deformation element according to claim 1, wherein the section wall end length has maximum wall thickness that is at least 5%, and at most 200%, greater than a minimum wall thickness of the section wall length neighboring the section wall end length.

7. A deformation element according to claim 6, wherein the maximum wall thickness of the section wall end length is at least 15% greater than the minimum wall thickness of the section wall length neighboring the section wall end length.

8. A deformation element according to claim 7, wherein the maximum wall thickness of the section wall end length is at least 20% greater than the minimum wall thickness of the section wall length neighboring the section wall end length.

9. A deformation element according to claim 6, wherein the maximum wall thickness of the section wall end length is at most 150% greater than the minimum wall thickness of the section wall length neighboring the section wall end length.

10. A deformation element according to claim 9, wherein the maximum wall thickness of the section wall end length is at most 100% greater than the minimum wall thickness of section wall length neighboring the section wall end length.

11. A deformation element according to claim 1, wherein the section wall end length has an average wall thickness that is at least 5%, and at most 200%, greater than an average wall thickness of the section wall length neighboring the section wall end length.

12. A deformation element according to claim 11, wherein the average wall thickness of the section wall end length is at least 15% greater than the average wall thickness of the section wall length neighboring the section wall end length.

13. A deformation element according to claim 12, wherein the average thickness of the section wall end length is at least 20% greater than the average wall thickness of the section wall length neighboring the section wall end length.

14. A deformation element according to claim 11, wherein the average wall thickness of the section wall end length is at most 100% greater than the average wall thickness of the section wall length neighboring the section wall end length.

15. A deformation element according to claim 14, wherein the average wall thickness of the section wall end length is at most 60% greater than the average wall thickness of the section wall length neighboring the section wall end length.

16. A deformation element according to claim 1, wherein the wall thickness of the section wall length neighboring the section wall end length is uniform.

17. A deformation element according to claim 1, the outer section wall face is flat and the inner section wall face in the section wall end lengths exhibits a slope which, measured relative to the outer section wall face, increases the wall thickness.

18. A deformation element according to claim 1, wherein the hollow section is box-shaped, the section wall length being an intermediate length provided between the two section wall end lengths of an outer section wall, whereby the section wall intermediate length corresponds with a section wall length neighboring the section wall end length.

19. A deformation element according to claim 1, wherein the section wall end length of a corner region has a length that corresponds to at least 10% of the length of the related section wall.

20. A deformation element according to claim 19, wherein the section wall end length has a length that corresponds to at least 15% of the length of the related section wall.

21. A deformation element according to claim 1, wherein the section wall end length has a length that corresponds to at most 35% of the length of the related section wall.

22. A deformation element according to claim 21, wherein the length of the section wall end length corresponds to at most 25% of the length of the related section wall.

23. A deformation element according to claim 1, wherein the hollow section is a multi-chamber hollow section with at least one inner section wall forming nodal regions, whereby the nodal regions are formed by at least two section wall end lengths of at least one of outer and inner section walls abutting at an angle and, in the section wall end lengths, the deformation element exhibits a greater wall thickness than in the section wall length neighboring the section wall end length.

24. A deformation element according to claim 1, wherein the hollow section is a multi-chamber hollow section.

25. A deformation element according to claim 1, wherein the hollow section is a single chamber hollow section.

* * * * *